Feb. 19, 1924. 1,484,270
G. W. MOBLEY
BOLL WEEVIL ERADICATOR
Filed Feb. 5, 1923   3 Sheets-Sheet 3
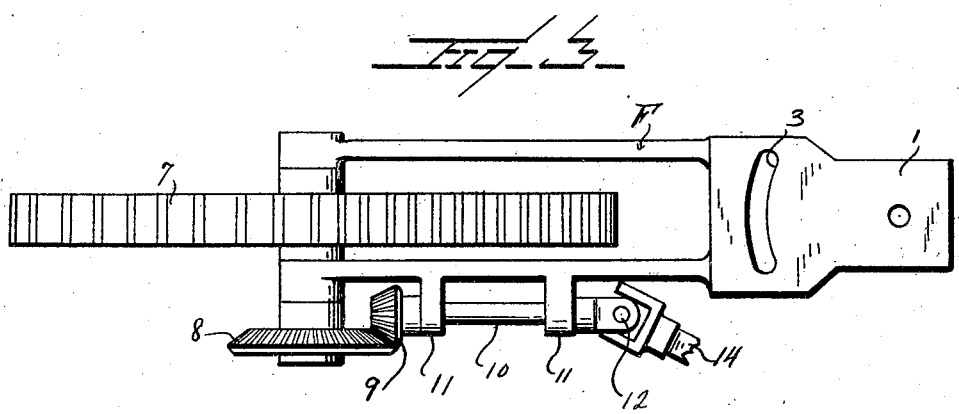
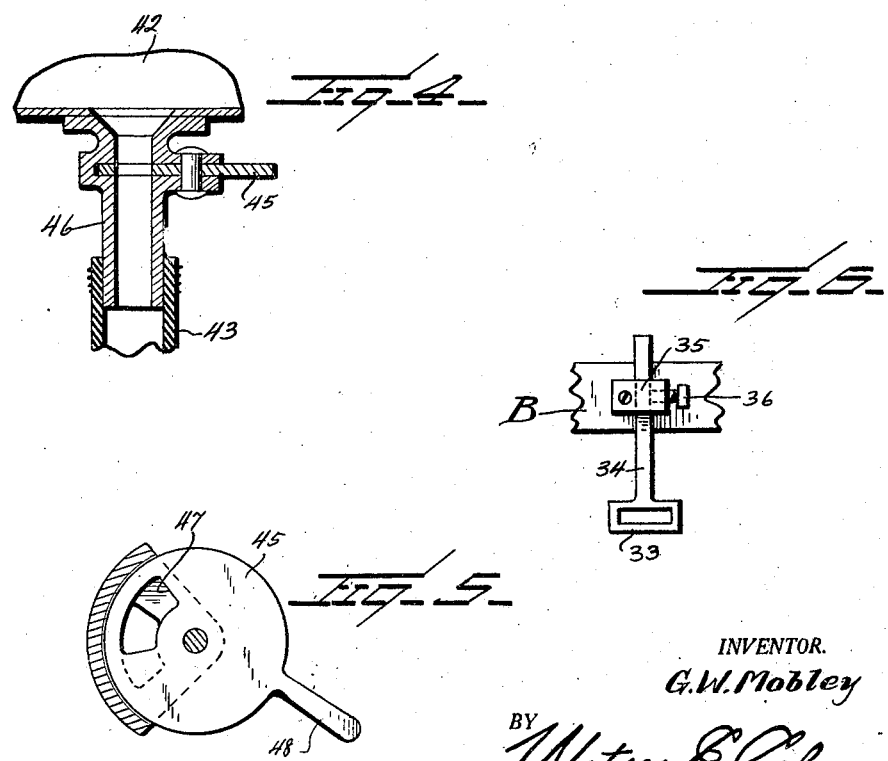
INVENTOR.
G. W. Mobley
BY Watson E. Coleman
ATTORNEY.

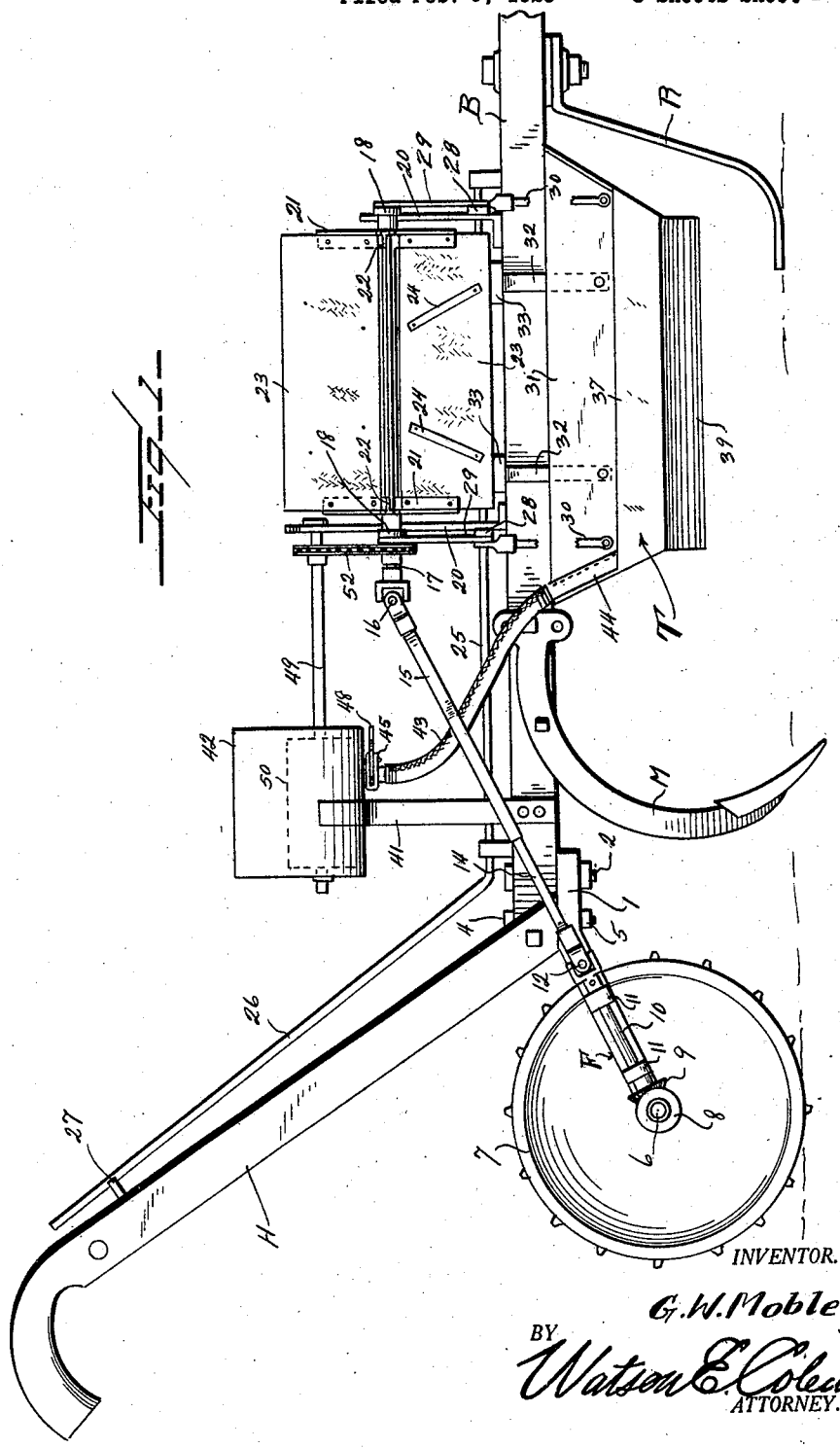

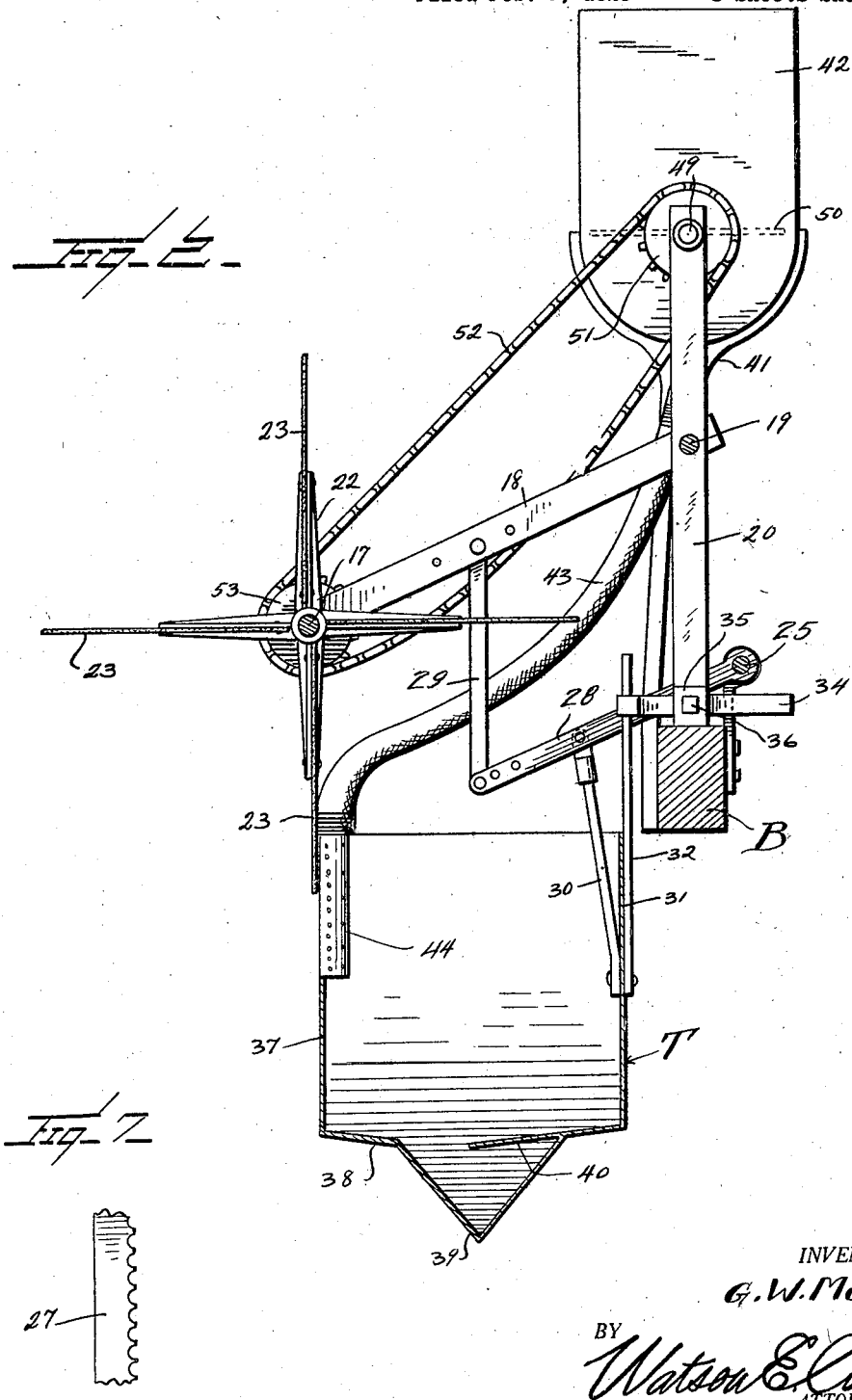

Patented Feb. 19, 1924.

1,484,270

UNITED STATES PATENT OFFICE.

GEORGE W. MOBLEY, OF WAYNESBORO, GEORGIA.

BOLL-WEEVIL ERADICATOR.

Application filed February 5, 1923. Serial No. 617,028.

*To all whom it may concern:*

Be it known that I, GEORGE WASHINGTON MOBLEY, a citizen of the United States, residing at Waynesboro, in the county of Burke and State of Georgia, have invented certain new and useful Improvements in Boll-Weevil Eradicators, of which the following is a specification, reference being had to the accompanying drawings.

This invention relates to certain improvements in boll weevil eradicators and it is an object of the invention to provide a novel and improved device of this general character which includes a rotatable beater operating to vibrate the foliage together with a trough supported in a position to receive the boll weevils or the like dislodged from the plants together with means for adjusting said beater and trough into a position best desired by the requirements of practice.

It is also an object of the invention to provide a novel and improved device of this general character having a beater and trough supported in desired relative position upon a plow beam or the like together with means for driving said beater.

An additional object of the invention is to provide a novel and improved device of this general character wherein means is provided for spraying suitable insecticide upon the plants.

The invention consists in the details of construction and in the combination and arrangement of the several parts of my improved boll weevil eradicator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a boll weevil eradicator constructed in accordance with an embodiment of my invention;

Figure 2 is a vertical sectional view taken through the forward portion of the device as illustrated in Figure 1;

Figure 3 is an enlarged fragmentary view in top plan of the supporting wheel associated with the rear portion of the device;

Figure 4 is an enlarged fragmentary vertical sectional view illustrating the means for controlling the discharge of insecticide;

Figure 5 is a view partly in plan and partly in horizontal section illustrating in detail the valve illustrated in Figure 4;

Figure 6 is a fragmentary view in top plan illustrating one of the brackets for positioning the trough with respect to the beam;

Figure 7 is a fragmentary view in top plan of the rack for holding the rocker arm against movement.

As disclosed in the accompanying drawings, B denotes a plow beam of a conventional type and which is provided at one end portion with the upstanding handle structure H.

F denotes a fork provided with an angularly disposed head 1 which underlies the rear portion of the beam B and is pivoted thereto through the instrumentality of the bolt 2. The head 1 inwardly of the pivot bolt 2 is provided with an arcuate slot 3 substantially concentric to the bolt 2 and through which is directed a second bolt 4 also extending through the beam B. This bolt 4 has engaged therewith the nut 5 which serves to hold or clamp the head in the desired adjusted position about the bolt 2.

The outer or free end portions of the arms of the fork F rotatably support a shaft 6. Fixed to the shaft 6 and positioned between the arms of the fork F is the ground engaging wheel 7 which serves, when the device in its entirety is travelling, to rotate the shaft 6.

Fixed to an end portion of the shaft 6 is a bevel gear 8 meshing with a second bevel gear 9 carried by the lower or outer end portion of a shaft 10. This shaft 10 is rotatably supported by the outstanding arms 11 carried by the adjacent arm of the fork F, said shaft being disposed longitudinally of the fork F. The inner or upper end portion of the shaft 10 is connected by a universal joint 12 with a shaft section 14 preferably angular in cross section and which is telescopically engaged within a second shaft section 15. The sections 14 and 15 rotate in unison but have free longitudinal movement one relative to the other.

The upper or outer end portion of the shaft section 15 is connected by a universal joint 16 with the shaft 17. The shaft 17 has its opposite end portions rotatably supported by the outer end portions of the elongated arms 18, each of said arms having its opposite or inner end portion pivotally connected as at 19 with an upstanding post 20 suitably mounted upon the beam B. The rear post 20 is of a height greater than the second or forward post for a purpose to be hereinafter more particularly referred to.

Fixed to the shaft 17 at points adjacent to the arms 18 are the spiders 21, each arm of one spider being in alignment lengthwise of the shaft 17 with the arm of the second spider. Connecting such aligned arms of the spiders are the paddles 23, said paddles being of cloth or other flexible material and having their outer marginal portions extending beyond the outer ends of the arms of the spiders. Each of the paddles 23 has secured thereto at desired points spaced lengthwise thereof the elongated metallic members 24 preferably resilient whereby the functioning of the paddle is facilitated.

Rotatably supported by the beam B and extending lengthwise thereof is a rock shaft 25 the rear portion of which being disposed upwardly on a predetermined incline to provide an operating handle 26 for imparting the desired rocking movement to the shaft 25. This rod 26 coacts with a rack 27 whereby the shaft 25 may be held against rotation after being rotated or rocked as desired.

Carried by the shaft 25 and disposed in the same general direction as the arms 18 are the parallel arms 28 having their outer end portions operatively engaged with the arms 18 through the medium of the rigid links 29 whereby the shaft 25 may be rocked to raise or lower the arms 18 and the shaft 17 carried thereby as the occasions of practice may require.

As the machine advances the shaft 17, through the instrumentality of the shaft sections 14 and 15 and the wheel 7, is caused to move downwardly from above whereby the paddles or blades 23 are caused to brush the stalks or foliage and to vibrate the same sufficient to dislodge the boll weevils or the like that may be thereon. The insects so dislodged are thrown into the trough T which is of desired configuration and which is positioned on the same side of the beam B as the shaft 17.

The trough T is suspended from the rock arms 28 by the rigid links 30 operatively engaged with said arms 28 and with the rear wall 31 of the trough T. By this means the trough T is caused to be raised or lowered with the shaft 17 so that at all times the trough T is in desired relation to the paddles or blades 23. The rear wall 31 of the trough T has also operatively engaged therewith the upstanding guide arms 32, each of which having its upper portion slidably disposed through a loop member or eye 33 carried by an end portion of a rod 34.

The rod 34 is disposed transversely of the upper face of the beam B and is slidably disposed through a bracket 35 secured to said upper face of the beam B. The rod 34 is adapted to be adjusted longitudinally in order to position the trough T with respect to the beam B as may be preferred. The rod 34 is fixed in desired adjusted position through the instrumentality of the binding screw 36 or the like carried by the bracket 35.

The trough T has its outer side wall 37 terminating a desired distance below the upper edge of the rear wall 31 so that the paddles or blades 23 may function to the best advantage.

The bottom wall 38 of the trough T is provided therealong with a well 39 herein disclosed as substantially V-shaped in cross section and which is adapted to contain suitable poison to kill the boll weevil or the like received therein. Partially overlying the top of the well 39 is an apron or plate 40 to prevent the plants under the action of the paddles or blades 23 from coming in contact with the insect life destroying agency or poison within the well 39. As is particularly illustrated in Figure 2 it is to be noted that the bottom 38 of the trough T at opposite sides of the wall 39 are inclined downwardly toward the well as is also the plate or apron 40. This is to insure the proper delivery of the insects within the well 39.

Extending upwardly from the rear portion of the beam B is a post 41 which supports a hopper 42 of desired capacity and which is adapted to contain a suitable insecticide, liquid or powder. It must be understood that I do not wish to limit myself in any way to the character of the insecticide.

Leading from the hopper 42 is a flexible conduit or hose 43 terminating in a nozzle 44 positioned within an end portion of the trough T and through which the insecticide is adapted to be sprayed upon the plants or foliage as the same is bended or flexed by the paddles or blades 23. By this means the plants are treated with a suitable insecticide to destroy the weevils, larvæ and eggs which may still be retained by the plants.

The flow through the conduit or hose 43 is controlled by a valve plate 45 having rocking movement within the casing or nipple 46 with which the conduit or hose 43 is directly engaged. This plate 45 is provided with an arcuate opening 47 adapted to register with the bore of the casing 46. By proper rotation of the plate 45 an effective regulation may be obtained of the flow or discharge of the insecticide, either dry or liquid, through the hose or conduit 43. To facilitate the desired manipulation of the plate 45 I provide the same with the outstanding and radially directed operating arm 48.

Extending through the lower portion of the hopper 42 is a shaft 49, the upper portion of the rear post 20 providing an out-bowed bearing for said shaft. Fixed to the shaft within the hopper 42 is a suitable agitator 50 indicated by dotted lines in Figures 1 and 2. This agitator 50 is of particular advantage when a dry insecticide such as calcium arsenate is used.

Fixed to the shaft 49 exteriorly of the hopper 42 is a sprocket wheel 51 in driven connection through the medium of the chain 52 with the sprocket 53 carried by the shaft 17 whereby the agitator 50 is operated from the wheel 7.

To support the forward end portion of the beam B I employ in connection therewith a runner R. This runner is particularly adapted for use when the ground working member or plow M is not employed.

From the foregoing description it is thought to be obvious that a boll weevil eradicator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A machine of the class described comprising a beam, a trough positioned therebelow, upstanding arms carried by the trough, guide brackets carried by the beam through which the arms are slidably disposed, a rock arm carried by the beam, an operative connection between the rock arm and trough for vertically adjusting the trough, a brushing medium carried by the beam, said brackets being adjustable toward or from the beam, and means for holding the brackets in a fixed position.

2. A machine of the class described comprising a beam, upstanding posts carried thereby, arms pivotally engaged with the posts, a brushing medium carried by said arms, a rock shaft mounted upon the beam, an operative connection between the rock arm and the first named arms for vertically adjusting the brushing medium, a trough carried by the beam and having vertical movement, and links connecting the trough and the rock arms whereby the trough and brushing medium are simultaneously adjusted.

In testimony whereof I hereunto affix my signature.

GEORGE W. MOBLEY.